US008397569B2

(12) United States Patent
Kuroda et al.

(10) Patent No.: US 8,397,569 B2
(45) Date of Patent: Mar. 19, 2013

(54) INERTIAL FORCE SENSOR

(75) Inventors: Keisuke Kuroda, Osaka (JP); Takeshi Uemura, Osaka (JP)

(73) Assignee: Panasonic Corporation, Osaka (JP)

( * ) Notice: Subject to any disclaimer, the term of this patent is extended or adjusted under 35 U.S.C. 154(b) by 235 days.

(21) Appl. No.: 12/936,446

(22) PCT Filed: Apr. 8, 2009

(86) PCT No.: PCT/JP2009/001628
§ 371 (c)(1),
(2), (4) Date: Oct. 5, 2010

(87) PCT Pub. No.: WO2009/125589
PCT Pub. Date: Oct. 15, 2009

(65) Prior Publication Data
US 2011/0041607 A1 Feb. 24, 2011

(30) Foreign Application Priority Data

Apr. 10, 2008 (JP) .................. 2008-102278

(51) Int. Cl.
*G01C 19/00* (2006.01)
(52) U.S. Cl. .................................... 73/504.12
(58) Field of Classification Search ............... 73/504.12, 73/581, 514.16, 514.35; 702/41
See application file for complete search history.

(56) References Cited

U.S. PATENT DOCUMENTS

| | | | | |
|---|---|---|---|---|
| 3,874,743 A | * | 4/1975 | Fleischer et al. | 303/122.05 |
| 4,233,599 A | * | 11/1980 | Brearley | 340/679 |
| 4,918,606 A | * | 4/1990 | Ito et al. | 701/63 |
| 5,108,181 A | * | 4/1992 | Nakagami | 356/464 |
| 5,352,938 A | * | 10/1994 | Wise et al. | 327/72 |
| 5,406,485 A | * | 4/1995 | Wise et al. | 701/30.9 |
| 5,476,311 A | * | 12/1995 | Fennel et al. | 303/122.06 |
| 5,517,431 A | * | 5/1996 | Pattantyus et al. | 702/116 |
| 5,939,630 A | | 8/1999 | Nozoe et al. | |

(Continued)

FOREIGN PATENT DOCUMENTS

| | | |
|---|---|---|
| EP | 1 367 367 A1 | 12/2003 |
| EP | 1367367 A1 * | 12/2003 |

(Continued)

OTHER PUBLICATIONS

English Translation of JP 2001-004653.*

(Continued)

*Primary Examiner* — Peter Macchiarolo
*Assistant Examiner* — Samir M Shah
(74) *Attorney, Agent, or Firm* — Pearne & Gordon LLP

(57) ABSTRACT

An inertial force sensor which reduces the deterioration of an angular speed detection accuracy and improves the diagnosis accuracy of fault diagnosis is provided.
The inertial force sensor includes an oscillator having a driving electrode, a monitor electrode, and a detecting electrode; a driving circuit which applies a driving signal to the driving electrode to oscillate the oscillator; a detecting circuit which detects an angular speed according to a detecting signal outputted from the detecting electrode due to an inertial force; an oscillation control circuit which controls an energization amount of the driving signal according to a monitor signal outputted from the monitor electrode; and a fault diagnosing circuit which inputs a pseudo angular speed signal to the detecting circuit for fault diagnosis, wherein a filter switching circuit which switches a characteristic of a filter circuit included in the detecting circuit in fault diagnosis mode to shorten a delay time is provided.

7 Claims, 10 Drawing Sheets

U.S. PATENT DOCUMENTS

| | | | |
|---|---|---|---|
| 6,089,091 A | 7/2000 | Nozoe et al. | |
| 6,223,107 B1 * | 4/2001 | Mergenthaler et al. | 701/29.7 |
| 6,244,095 B1 | 6/2001 | Nozoe et al. | |
| 6,456,946 B1 * | 9/2002 | O'Gorman | 702/58 |
| 6,625,527 B1 * | 9/2003 | Ding et al. | 701/30.6 |
| 7,103,460 B1 * | 9/2006 | Breed | 701/32.9 |
| 7,107,134 B1 * | 9/2006 | Melby et al. | 701/51 |
| 7,233,847 B2 * | 6/2007 | Otsuka | 701/30.6 |
| 7,746,091 B2 * | 6/2010 | Uemura | 324/750.3 |
| 7,825,786 B2 * | 11/2010 | Nishioka et al. | 340/441 |
| 8,131,508 B2 * | 3/2012 | Uemura | 702/183 |
| 2003/0196492 A1 * | 10/2003 | Remboski et al. | 73/593 |
| 2003/0200014 A1 * | 10/2003 | Remboski et al. | 701/29 |
| 2005/0216149 A1 * | 9/2005 | Kato | 701/29 |
| 2005/0222743 A1 * | 10/2005 | Otsuka | 701/70 |
| 2006/0077013 A1 * | 4/2006 | Tsuruhara et al. | 331/74 |

FOREIGN PATENT DOCUMENTS

| | | | |
|---|---|---|---|
| JP | 09-014969 A | | 1/1997 |
| JP | 09014969 A * | | 1/1997 |
| JP | 09-203639 A | | 8/1997 |
| JP | 09-281138 A | | 10/1997 |
| JP | 2001-004653 A | | 1/2001 |
| JP | 2001004653 A * | | 1/2001 |
| JP | 2002-267448 A | | 9/2002 |
| JP | 2004-037432 A | | 2/2004 |
| JP | 2004-153957 A | | 5/2004 |
| JP | 4056852 B2 * | | 3/2008 |
| WO | 2008/139743 A1 | | 11/2008 |

OTHER PUBLICATIONS

English Translation of JP 2004-153957 A.*
International Search Report for Appl. No. PCT/JP2009/001628 dated Apr. 28, 2009.
Machine Translation of JP 2004-153957 A, which was cited in IDS dated Oct. 5, 2010.

* cited by examiner

PRIOR ART   FIG. 11
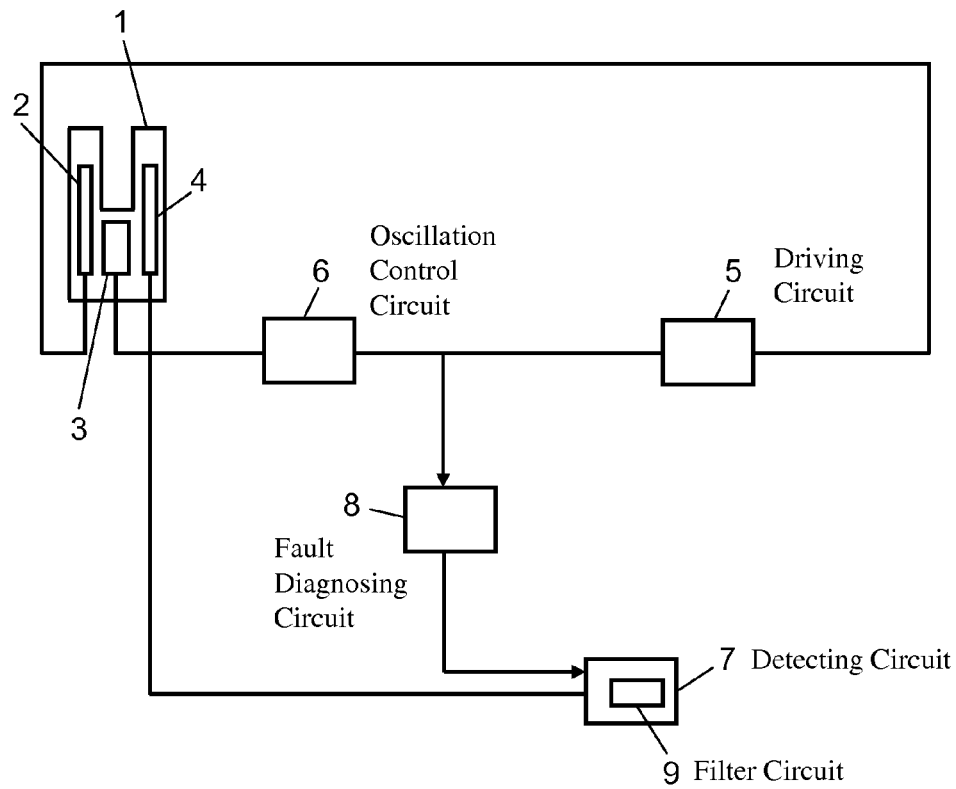
PRIOR ART   FIG. 12
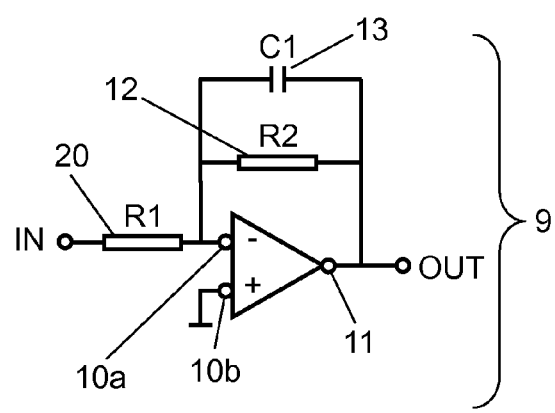

INERTIAL FORCE SENSOR

TECHNICAL FIELD

The present invention relates to an inertial force sensor used in various electronic equipment, for example, used for attitude control, navigation, or the like, of a mobile body such as an aircraft, an automobile, a robot, a watercraft, and a vehicle.

BACKGROUND ART

A conventional angular speed sensor will be described below.

FIG. 11 is a circuit block diagram of the conventional angular speed sensor. In FIG. 11, the conventional angular speed sensor has oscillator 1 having driving electrode 2, monitor electrode 3, and detecting electrode 4, driving circuit 5, oscillation control circuit 6, detecting circuit 7, fault diagnosing circuit 8, and filter circuit 9. Driving circuit 5 applies a driving signal to driving electrode 2 to oscillate oscillator 1. Detecting circuit 7 detects an angular speed according to a detecting signal outputted from detecting electrode 4 due to an inertial force. Oscillation control circuit 6 controls an energization amount of the driving signal according to a monitor signal outputted from monitor electrode 3. Fault diagnosing circuit 8 inputs a pseudo angular speed signal to detecting circuit 7 for fault diagnosis.

FIG. 12 is an equivalent circuit diagram of filter circuit 9 included in detecting circuit 7. In filter circuit 9, an input signal is inputted to one input terminal 10a, the other input terminal 10b is grounded, and an output signal is outputted from output terminal 11. The input signal is inputted to an input portion (IN) via resistor 20 (R1). Resistor 12 (R2) and capacitor 13 (C1) are connected in parallel to input terminal 10a and output terminal 11. A filtered signal is outputted from an output portion (OUT) of filter circuit 9.

The detecting signal is filtered by filter circuit 9 of detecting circuit 7 and is outputted as a predetermined signal. An angular speed is detected according to the predetermined signal. The filter is a low-pass filter or a high-pass filter. A cutoff frequency of filter circuit 9 is about 10 Hz.

In the fault diagnosis of the inertial force sensor, as shown in FIG. 11, the pseudo angular speed signal for fault diagnosis is inputted to detecting circuit 7 by fault diagnosing circuit 8 at the time of start after power-on. When the angular speed is detected according to the pseudo angular speed signal, it can be judged that no faults have occurred.

As conventional document information on the invention of this application, Patent Document 1, for example, has been known. In the above conventional configuration, the detecting signal is filtered by filter circuit 9 of detecting circuit 7. As shown in FIG. 12, resistor 20 (R1), resistor 12 (R2), and capacitor 13 (C1) are included in filter circuit 9. These are typically delay elements. Here, a transfer function of filter circuit 9 is expressed by Equation 1, a phase characteristic thereof is expressed by Equation 2, and a delay time thereof is expressed by Equation 3.

$$T(\omega) = \frac{-R2}{R1(1 + j\omega \cdot C1 \cdot R2)}$$ [Equation 1]

$$\Phi(\omega) = \arctan(-\omega \cdot C1 \cdot R2)$$ [Equation 2]

$$T = \delta\Phi(\omega)/\delta\omega$$ [Equation 3]

According to Equations 1 to 3, the delay time of filter circuit 9 is caused by the delay elements. When values of resistor 12 (R2) and capacitor 13 (C1) are large, time constant τ defined by Equation 4 is increased. Accordingly, the delay time becomes longer.

$$\tau = C1 \times R2$$ [Equation 4]

When the delay time becomes longer, as shown in FIG. 13, the output of the detecting signal is delayed with respect to pseudo angular speed signal 21 for fault diagnosis. Responsibility at the time of fault diagnosis is lowered. Accordingly, the diagnosis accuracy of fault diagnosis is lowered. To shorten the delay time, the values of resistor 12 (R2) and capacitor 13 (C1) as the delay elements should be smaller. However, when the values of resistor 12 (R2) and capacitor 13 (C1) as the delay elements are smaller, the cutoff frequency is increased, which affects angular speed detection accuracy. The above configuration has the problem that the accuracy of fault diagnosis cannot be improved by shortening the delay time while lowering the cutoff frequency.

[Patent Document 1] Unexamined Japanese Patent Publication No. 2002-267448

DISCLOSURE OF THE INVENTION

The present invention provides an inertial force sensor which can reduce the deterioration of an angular speed detection accuracy and improve the diagnosis accuracy of fault diagnosis.

The present invention includes an oscillator having a driving electrode, a monitor electrode, and a detecting electrode; a driving circuit which applies a driving signal to the driving electrode to oscillate the oscillator; a detecting circuit which detects an angular speed according to a detecting signal outputted from the detecting electrode due to an inertial force; an oscillation control circuit which controls an energization amount of the driving signal according to a monitor signal outputted from the monitor electrode; and a fault diagnosing circuit which switches a characteristic of the filter circuit included in the detecting circuit and inputs a pseudo angular speed signal to the detecting circuit for fault diagnosis.

With the above configuration, the characteristic of the filter circuit is switched to shorten a delay time. Accordingly, when the pseudo angular speed signal is inputted to the detecting circuit at the time of fault diagnosis, its responsibility is good and the diagnosis accuracy of fault diagnosis can be improved.

BRIEF DESCRIPTION OF THE DRAWINGS

FIG. 11 is a circuit block diagram of a conventional angular speed sensor;

FIG. 12 is an equivalent circuit diagram of a conventional filter circuit; and

REFERENCE MARKS IN THE DRAWINGS

Figure 1:
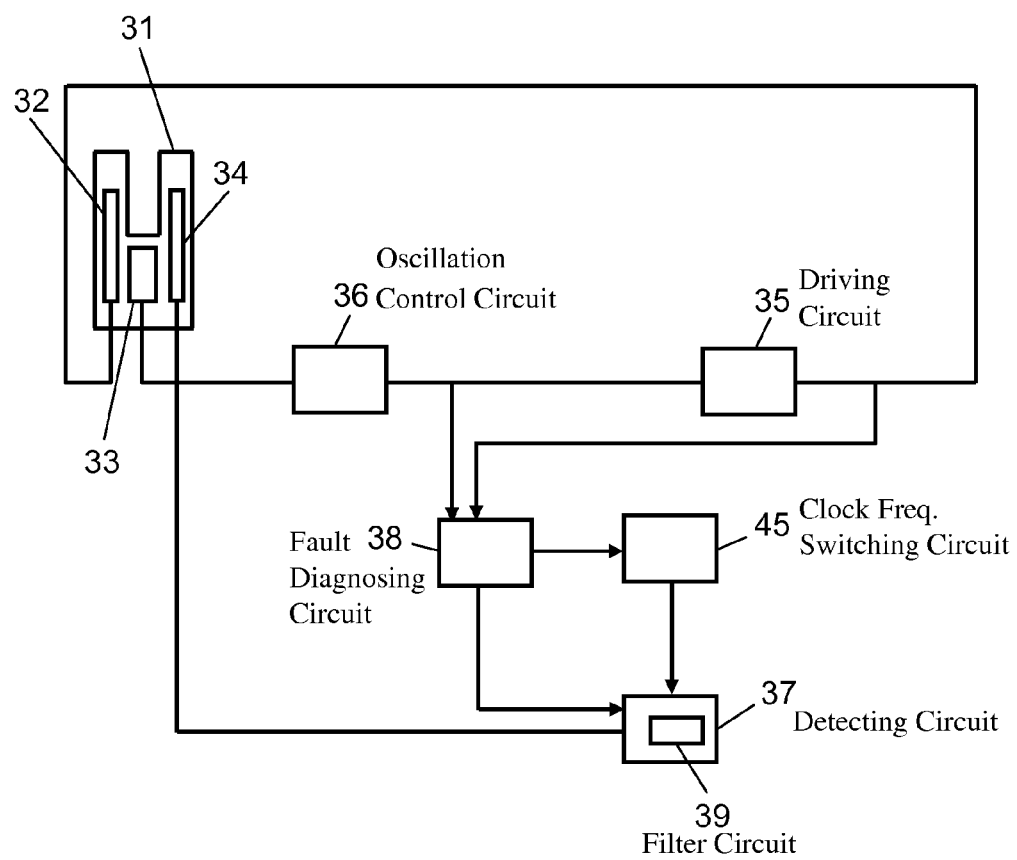
FIG. 1 is a circuit block diagram of an angular speed sensor according to an embodiment of the present invention.

31 Oscillator
32 Driving electrode
33 Monitor electrode
34 Detecting electrode
35 Driving circuit
36 Oscillation control circuit
37 Detecting circuit
38 Fault diagnosing circuit
39 Filter circuit
40a Input terminal
40b Input terminal
41 Output terminal
42a First switch portion
42b Second switch portion
43 Capacitor
44 Switch
45 Clock frequency switching circuit
50 Capacitor
51 Digital filter circuit
52 First amplifier
53 Second amplifier
54 Delay device
55 Adder
56 A/D converter circuit
60 Switch
61 Switch
62 Switch
63 Switch
70 Capacitor

PREFERRED EMBODIMENTS FOR CARRYING OUT OF THE INVENTION

An inertial force sensor according to an embodiment of the present invention will be described below with reference to the drawings. FIG. 1 is a circuit block diagram of an angular speed sensor according to an embodiment of the present invention. In FIG. 1, the angular speed sensor has oscillator 31 having driving electrode 32, monitor electrode 33, and detecting electrode 34, driving circuit 35, oscillation control circuit 36, detecting circuit 37, and fault diagnosing circuit 38. Driving circuit 35 applies a driving signal to driving electrode 32 to oscillate oscillator 31. Detecting circuit 37 detects an angular speed according to a detecting signal outputted from detecting electrode 34 due to an inertial force. Oscillation control circuit 36 controls an energization amount of the driving signal according to a monitor signal outputted from monitor electrode 33. Fault diagnosing circuit 38 inputs a pseudo angular speed signal to detecting circuit 37 for fault diagnosis.

Detecting circuit 37 has filter circuit 39 whose responsibility is determined according to a clock frequency and which filters the detecting signal. Filter circuit 39 is a switched capacitor filter.

Figure 2:
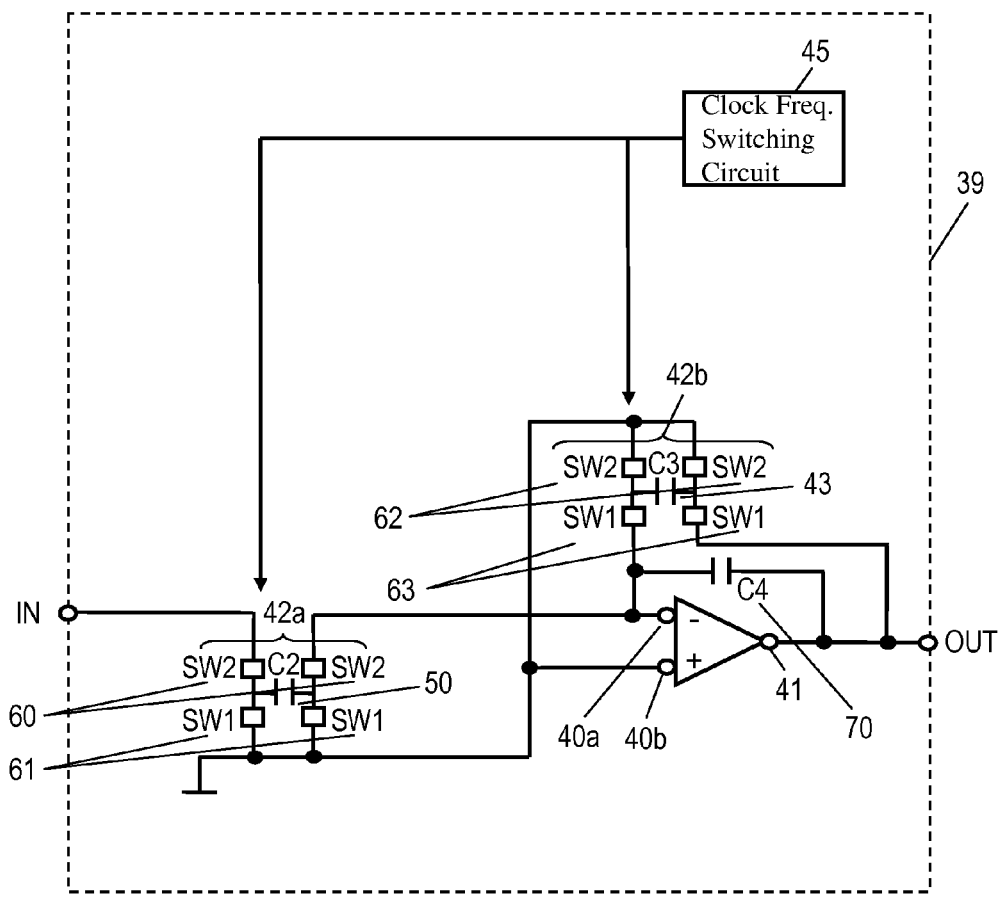
FIG. 2 is an equivalent circuit diagram of a filter circuit portion of an embodiment.

As shown in FIG. 2, in filter circuit 39, a signal inputted from an input portion (IN) is filtered by a predetermined characteristic and is outputted from an output portion (OUT). An input signal is inputted to one input terminal 40a. The other input terminal 40b is grounded. An output signal is outputted from output terminal 41. First switch portion 42a having capacitor 50 (C2) and a plurality of switches 60 (SW2) and 61 (SW1) are connected to input terminal 40a and input terminal 40b. An input signal is inputted via first switch portion 42a. Second switch portion 42b having capacitor 43 (C3) and a plurality of switches 62 (SW2) and 63 (SW1) are connected to input terminal 40a, input terminal 40b, and output terminal 41. Clocks are inputted from clock frequency switching circuit 45 to first switch portion 42a and second switch portion 42b to control opening and closing of the switch portions.

First switch portion 42a, second switch portion 42b, and capacitor 70 (C4) correspond to resistor 20 (R1), resistor 12 (R2), and capacitor 13 (C1) of FIG. 12, respectively. First switch portion 42a is operated as an input resistor. Second switch portion 42b is operated as a feedback resistor which feeds back the output signal of output terminal 41 to input terminal 40a. Capacitor 70 (C4) is operated as a feedback capacitor which feeds back the output signal of output terminal 41 to input terminal 40a.

Figure 3:
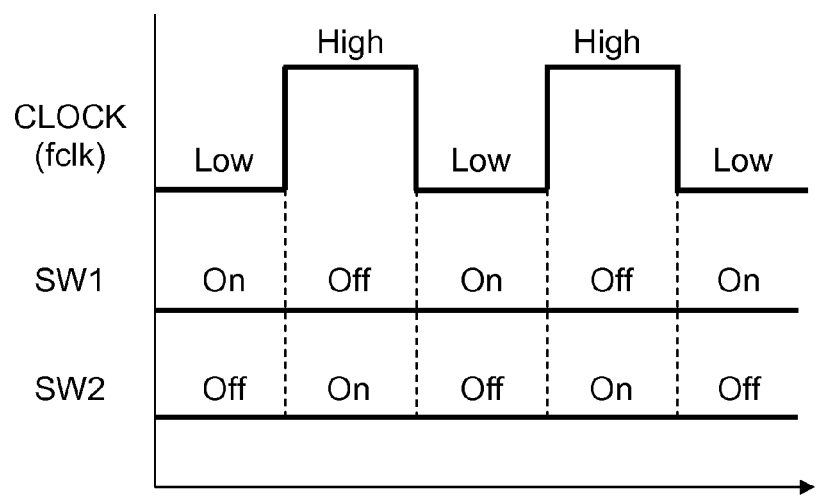
FIG. 3 is a diagram showing the relation between a clock controlling the filter circuit and "On" and "Off" of SW1 and SW2.

Switches 61 and 63 (SW1) and switches 60 and 62 (SW2) are operated as a pair, respectively. "On" and "Off" of the SW1 and SW2 are opposite each other according to a clock. FIG. 3 shows the relation between "High" and "Low" of a clock and "On" and "Off" of SW1 and SW2.

Figure 4:
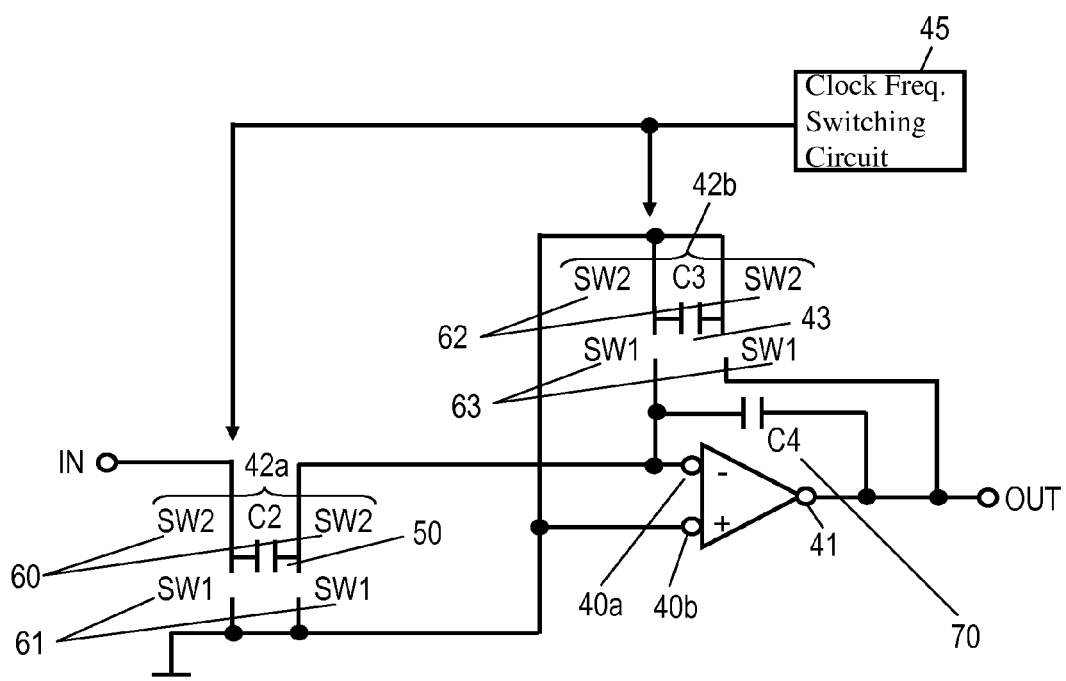
FIG. 4 is an equivalent circuit diagram of the filter circuit portion in a section in which the clock controlling the filter circuit is "High"

In a section in which the clock is "High", the SW1 is turned off and the SW2 is turned on. The equivalent circuit diagram of the filter circuit portion of FIG. 2 is as shown in FIG. 4.

Figure 5:
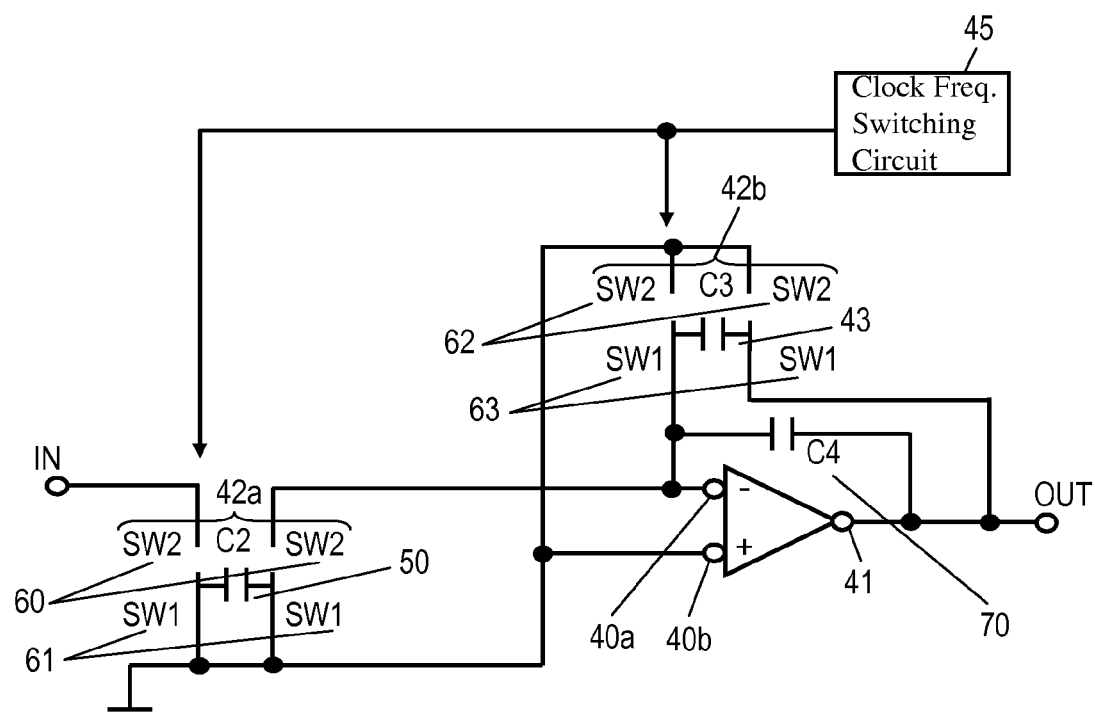
FIG. 5 is an equivalent circuit diagram of the filter circuit portion in a section in which the clock controlling the filter circuit is "Low"

In a section in which the clock is "Low", the SW1 is turned on and the SW2 is turned off. The equivalent circuit diagram of the filter circuit portion of FIG. 2 is as shown in FIG. 5

With the above configuration, filter circuit 39 is operated as a switched capacitor filter.

Figure 6:
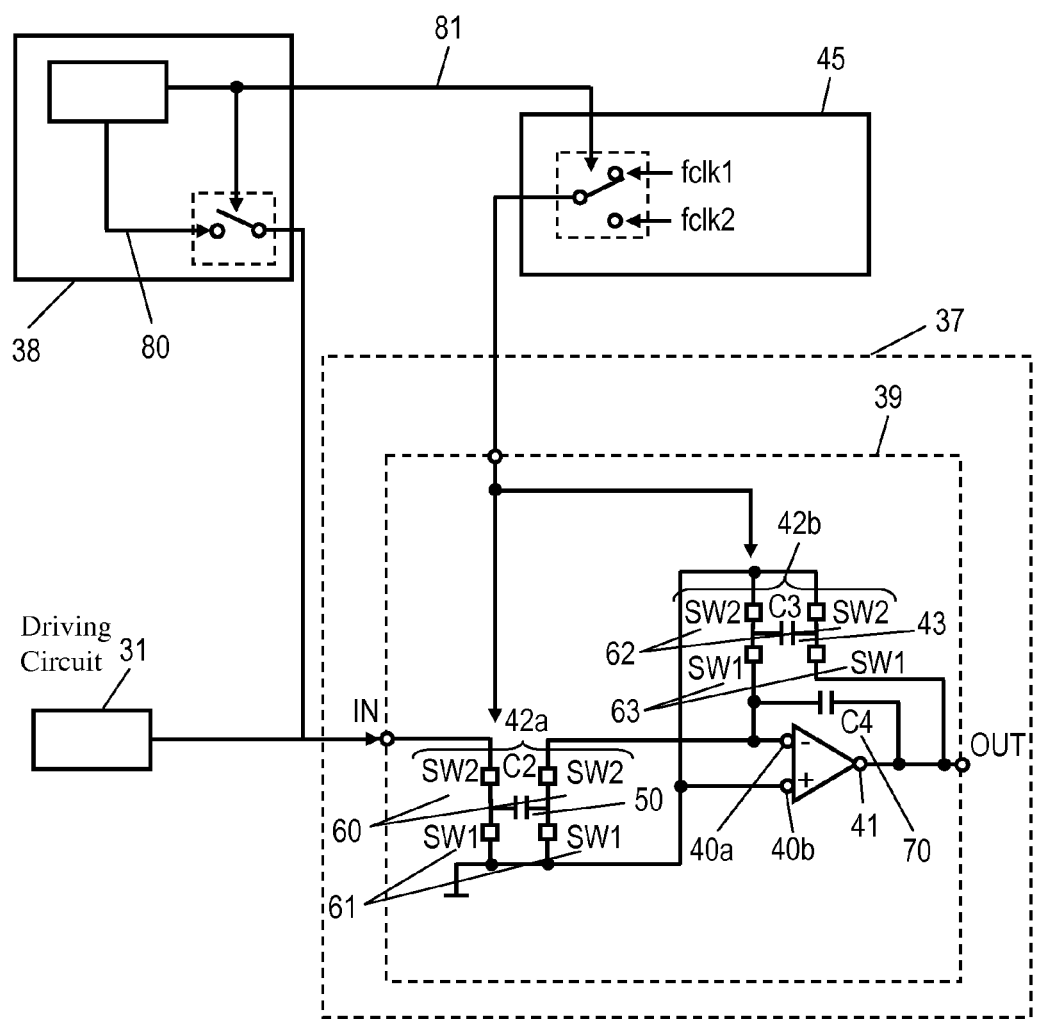
FIG. 6 is a diagram showing an overall signal flow according to an embodiment.

FIG. 6 shows an overall signal flow between filter circuit 39, clock frequency switching circuit 45, and fault diagnosing circuit 38.

The reference numeral 80 denotes a pseudo angular speed signal for fault diagnosis outputted from fault diagnosing circuit 38. The reference numeral 81 denotes a mode switching signal which switches between a normal mode and a fault diagnosis mode. Mode switching signal 81 selects the clock of clock frequency switching circuit 45 at frequency fclk1 in the normal mode and selects it at frequency fclk2 higher than fclk1 in the fault diagnosis mode.

Figure 7:
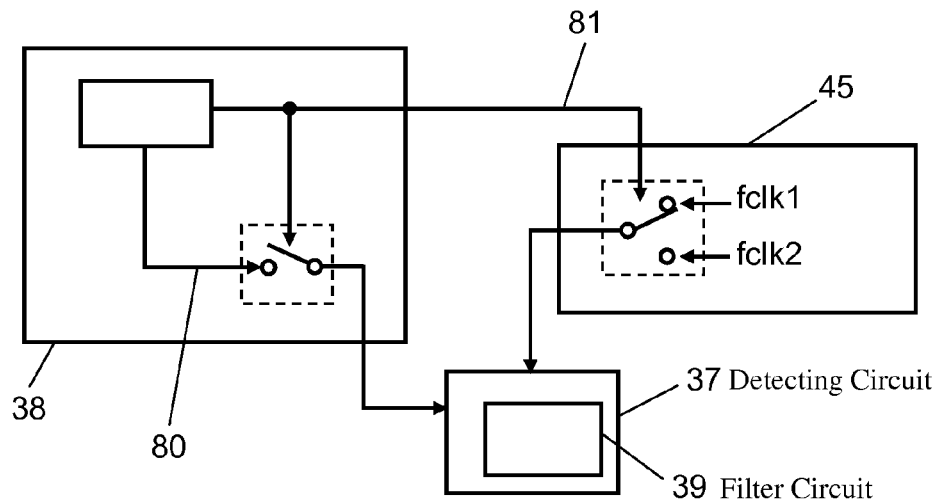
FIG. 7 is an operation diagram in normal mode according to an embodiment.

FIG. 7 shows an operation in the normal mode in which fault diagnosis is not performed. The clock having clock frequency fclk1 is inputted from clock frequency switching circuit 45 to filter circuit 39. Pseudo angular speed signal 80 is not outputted from fault diagnosing circuit 38.

Figure 8:
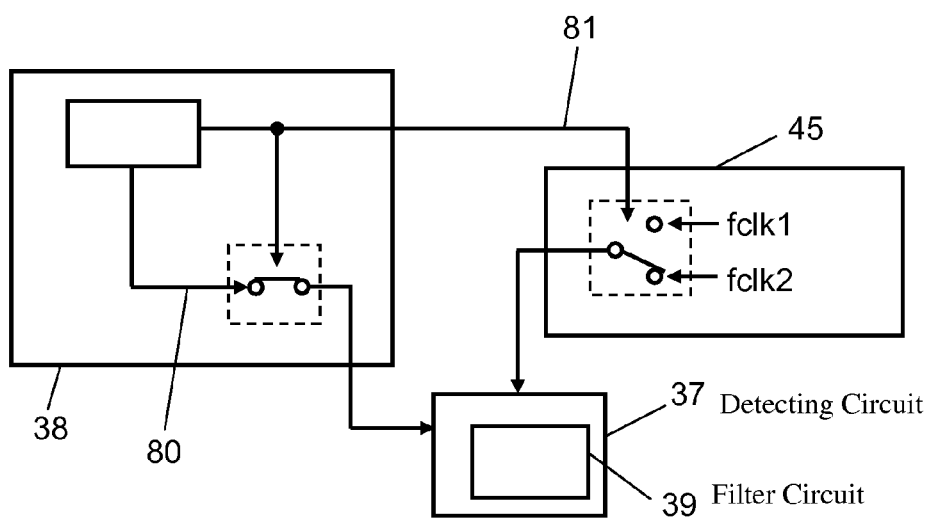
FIG. 8 is an operation diagram in fault diagnosis mode according to an embodiment.

FIG. 8 shows an operation in the fault diagnosis mode. In the fault diagnosis mode, pseudo angular speed signal 80 outputted from fault diagnosing circuit 38 is inputted to detecting circuit 37 by mode switching signal 81. The clock having clock frequency fclk2 higher than fclk1 is inputted to filter circuit 39 by clock frequency switching circuit 45 to switch a characteristic of filter circuit 39.

The detecting signal is filtered by filter circuit 39 of detecting circuit 37 and is outputted as a predetermined signal. A predetermined angular speed is detected according to the predetermined signal. The filter may be a low-pass filter or a high-pass filter, and a filter having a predetermined filter characteristic. A cutoff frequency of filter circuit 39 is about 10 Hz.

In the fault diagnosis of the inertial force sensor, as shown in FIG. 1, the pseudo angular speed signal for fault diagnosis is inputted to detecting circuit 37 by fault diagnosing circuit 38 at the time of start after power-on. When the predetermined angular speed is detected according to the pseudo angular speed signal, it can be judged that no faults have occurred.

The clock frequency is switched by clock frequency switching circuit 45 so that the clock frequency in the fault diagnosis mode is higher than the clock frequency in the normal mode and the clock frequency in the normal mode is lower than the clock frequency in the fault diagnosis mode. Here, when the clock frequency of the clock is fclk, a transfer function of filter circuit 39 is expressed by Equation 5, a phase characteristic thereof is expressed by Equation 6, and a delay time thereof is expressed by Equation 7.

$$T(\omega) = \frac{-C2}{C3} \cdot \frac{1}{1 + \frac{j\omega \cdot C4}{C3 \cdot fclk}}$$ [Equation 5]

$$\Phi(\omega) = \arctan\left(-\omega \cdot C4 \cdot \frac{1}{C3 \cdot fclk}\right)$$ [Equation 6]

$$T = \delta\Phi(\omega)/\delta\omega$$ [Equation 7]

According to Equations 5 to 7, the delay time of filter circuit 39 is caused by capacitor 43 (C3) and capacitor 70 (C4) as delay elements. It is also caused by clock frequency fclk. Particularly, as shown in Equation 6, when clock frequency fclk is higher, the delay time is shortened. The clock frequency is increased to fclk2 so as to shorten the delay time in the fault diagnosis mode. In the normal mode, the clock frequency is decreased to fclk1.

Figure 9:
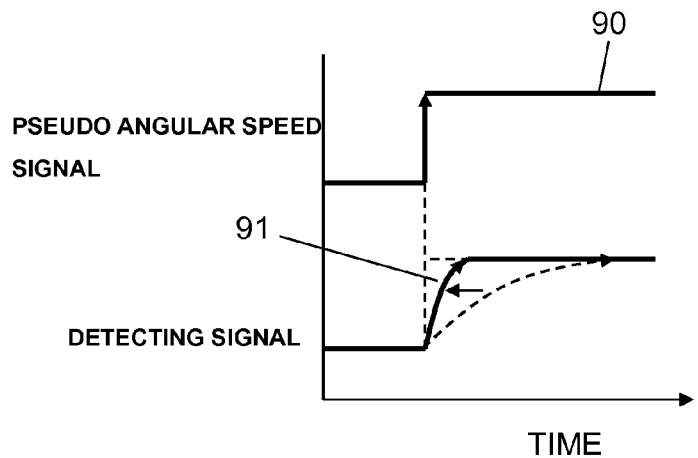
FIG. 9 is a characteristic diagram showing responsibility in the fault diagnosis mode according to an embodiment.

With the above configuration, diagnosing means which shortens the delay time due to the delay elements included in detecting circuit 37 for fault diagnosis is provided. Accordingly, when the pseudo angular speed signal is inputted to detecting circuit 37, responsibility is good so that the diagnosis accuracy of fault diagnosis can be improved. As shown in FIG. 9, the responsibility of the detecting signal with respect to the input of the pseudo angular speed signal for fault diagnosis becomes higher.

Filter circuit 39 whose responsibility is determined according to a clock frequency and which filters the detecting signal is provided. Filter circuit 39 is a switched capacitor filter. The clock frequency is switched by clock frequency switching circuit 45 so that the clock frequency in the fault diagnosis mode is higher than the clock frequency in the normal mode and the clock frequency in the normal mode is lower than the clock frequency in the fault diagnosis mode. Accordingly, the diagnosis accuracy of fault diagnosis can be easily improved and the deterioration of angular speed detection accuracy can be reduced.

When fault diagnosis is performed at the time of start immediately after power-on and the normal mode is a stable driving state after power-on, the clock frequency is increased at the time of start to shorten the delay time, thereby improving the diagnosis accuracy of fault diagnosis. In the stable driving state, the clock frequency may be lowered to return the delay time to the original and the cutoff frequency in a predetermined low frequency range may be secured, thereby reducing the deterioration of the angular speed detection accuracy. In particular, fault diagnosis is performed at the time of start, which is effective as misdetection can be reduced immediately after start. Fault diagnosis may be performed in the stable driving state other than at the time of start. Fault diagnosis is performed at all times in the stable driving state, which is effective as the deterioration of the angular speed detection accuracy can be reduced.

In place of the above, the clock frequency may be switched so that the cutoff frequency of filter circuit 39 in the fault diagnosis mode is higher than the cutoff frequency in the normal mode and the cutoff frequency in the normal mode is lower than the cutoff frequency in the fault diagnosis mode.

When the clock frequency is higher, the cutoff frequency is increased (the delay time becomes shorter). When the clock frequency is lower, the cutoff frequency is decreased (the delay time becomes longer). The clock frequency is increased at the time of start to shorten the delay time, thereby improving the diagnosis accuracy of fault diagnosis. The clock frequency is lowered in the normal mode to return the delay time to the original and the cutoff frequency in a predetermined low frequency range is secured, thereby reducing the deterioration of the angular speed detection accuracy.

Figure 10:
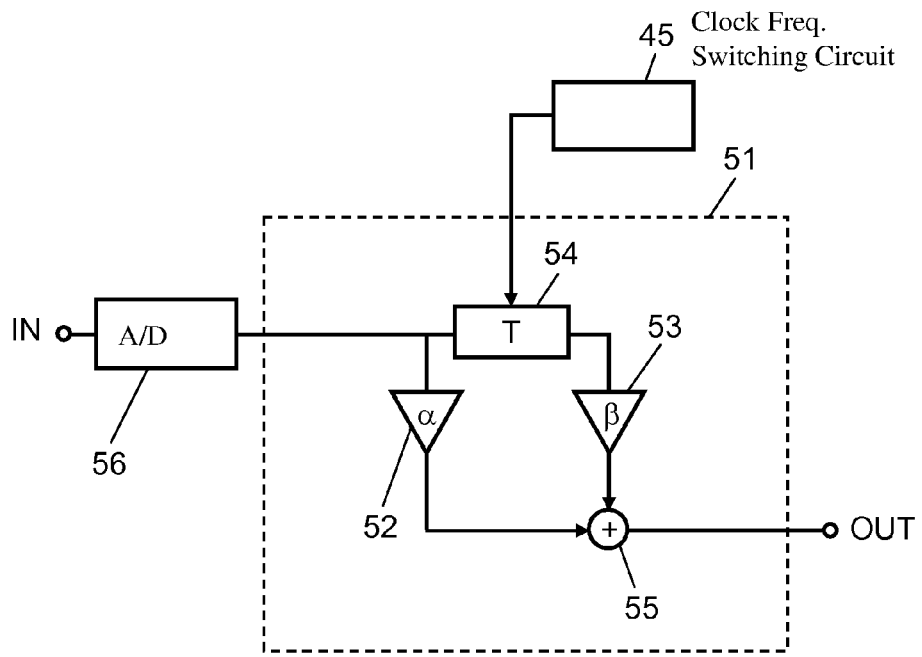
FIG. 10 is an equivalent circuit diagram of a digital filter circuit according to an embodiment.
Figure 13:
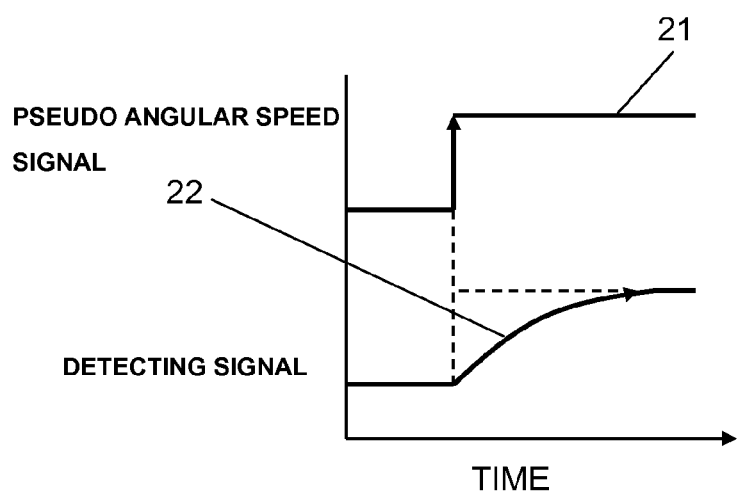
FIG. 13 is a characteristic diagram showing responsibility in the fault diagnosis mode of a background art.

In place of filter circuit 39 shown in FIG. 2, digital filter circuit 51 as shown in FIG. 10 may be used. Specifically, the detecting signal from detecting electrode 34 shown in FIG. 1 and the output signal from fault diagnosing circuit 38 are inputted to A/D converter circuit 56 shown in FIG. 10 and are converted to digital signals. The digital signals are inputted to first amplifier 52 having amplification degree α and delay device 54 whose delay time T is determined by the clock having clock frequency fclk supplied from clock frequency switching circuit 45. An output of delay device 54 is inputted to second amplifier 53 having amplification degree β. The outputs of first amplifier 52 and second amplifier 53 are added by adder 55 for output.

Here, a transfer function of digital filter circuit 51 is expressed by Equation 8, a phase characteristic thereof is expressed by Equation 9, and a delay time thereof is expressed by Equation 10.

$$T(\omega) = \alpha + \beta(\cos\omega T - j \cdot \sin\omega T)$$ [Equation 8]

$$\Phi(\omega) = \arctan\left(\frac{-\beta \cdot \sin\omega T}{\alpha + \beta\cos\omega T}\right)$$ [Equation 9]

$$T = \delta\Phi(\omega)/\delta\omega$$ [Equation 10]

In this configuration, delay time T of delay device 54 is in proportion to the inverse number of clock frequency fclk of the clock supplied from clock frequency switching circuit 45. The clock frequency is increased so that delay time T of delay device 54 can be reduced. An input and output delay time of digital filter circuit 51 can be shorter. As a result, the accuracy of fault diagnosis can be improved.

INDUSTRIAL APPLICABILITY

The angular speed sensor according to the present invention can improve detection sensitivity according to operating mode, can realize high-speed and high-accuracy fault diagnosis particularly in the fault diagnosis mode, and is applicable to various electronic equipment.

The invention claimed is:

1. An inertial force sensor comprising:
an oscillator having a driving electrode, a monitor electrode, and a detecting electrode;
a driving circuit configured to apply a driving signal to the driving electrode to oscillate the oscillator;
a detecting circuit configured to detect an angular speed according to a detecting signal outputted from the detecting electrode due to an inertial force in a normal mode, the detecting circuit has a filter circuit which filters the detecting signal;
an oscillation control circuit configured to control an energization amount of the driving signal according to a monitor signal outputted from the monitor electrode; and
a fault diagnosing circuit, wherein
when in a fault diagnosis mode,
the detecting circuit is configured to switch a cutoff frequency of the filter circuit in the fault diagnosis mode higher than the cutoff frequency in the normal mode, and the fault diagnosing circuit is configured to input a pseudo angular speed signal to the detecting circuit for fault diagnosis after switching the cutoff frequency of the filter circuit.

2. The inertial force sensor according to claim 1, wherein the cutoff frequency of the filter circuit is determined according to a clock frequency.

3. The inertial force sensor according to claim 1, wherein responsibility of the filter circuit is determined according to a clock frequency and the fault diagnosing circuit performs fault diagnosis by making the clock frequency in the fault diagnosis mode higher than the clock frequency in the normal mode.

4. The inertial force sensor according to claim 2 or 3, wherein fault diagnosis is performed only at the time of start.

5. The inertial force sensor according to claim 2 or 3, wherein fault diagnosis is performed at either the time of start or the time of stable driving.

6. An inertial force sensor comprising:
an oscillator having a driving electrode, a monitor electrode, and a detecting electrode;
a driving circuit configured to apply a driving signal to the driving electrode to oscillate the oscillator;
a detecting circuit configured to detect an angular speed according to a detecting signal outputted from the detecting electrode due to an inertial force in a normal mode, the detecting circuit has a filter circuit which filters the detecting signal;
an oscillation control circuit configured to control an energization amount of the driving signal according to a monitor signal outputted from the monitor electrode; and
a fault diagnosing circuit, wherein
when in a fault diagnosis mode,
the detecting circuit is configured to switch a delay time of the filter circuit in the fault diagnosis mode lower than the delay time in the normal mode, and the fault diagnosing circuit is configured to input a pseudo angular speed signal to the detecting circuit for fault diagnosis after switching the delay time of the filter circuit to be lower.

7. The inertial force sensor according to claim 6, wherein responsibility of the filter circuit is determined according to a clock frequency and the fault diagnosing circuit performs fault diagnosis by making the clock frequency in the fault diagnosis mode higher than the clock frequency in the normal mode.

* * * * *